United States Patent Office 3,180,689
Patented Apr. 27, 1965

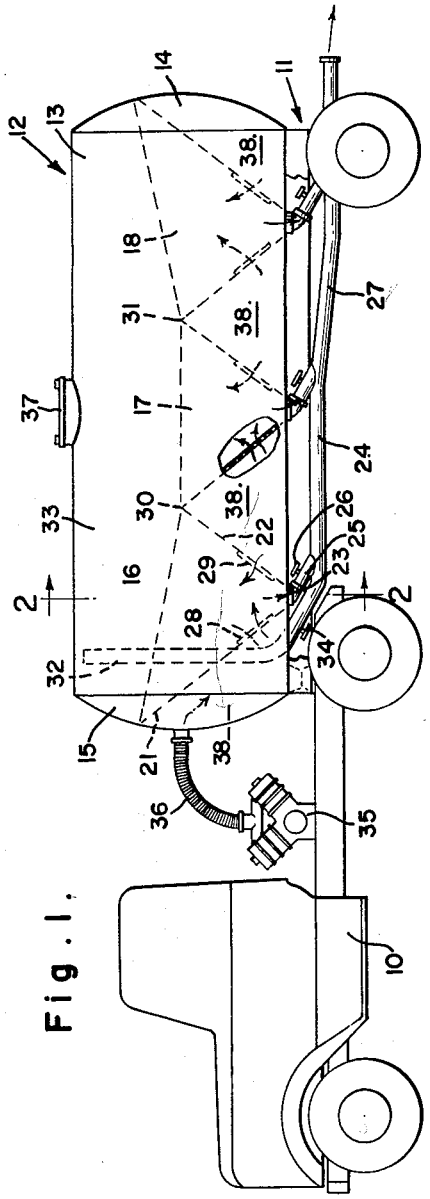
April 27, 1965   D. ALBERT   3,180,689
HORIZONTAL PRESSURE TANK CONSTRUCTION
Filed April 26, 1962
INVENTOR.
Douglas Albert
BY Townsend and Townsend
attorneys

3,180,689
HORIZONTAL PRESSURE TANK
CONSTRUCTION
Douglas Albert, Oakland, Calif., assignor to Albert Air
Conveyor Corp., Oakland, Calif.
Filed Apr. 26, 1962, Ser. No. 190,333
5 Claims. (Cl. 302—52)

This invention relates to pneumatic storage and discharge vessels. More particularly, it relates to storage tanks for dry pulverant materials from which the materials may be pneumatically discharged by utilizing fluidization techniques.

In a preferred embodiment the present invention provides means for storing and pneumatically discharging pulverant materials comprising an enclosed normally horizontally disposed elongate cylindrical tank defining a pressure chamber for containing pulverant materials to be stored and pneumatically conveyed therefrom. A plurality of hoppers are supported substantially wholly within the interior of the tank in spaced relation from each other along the longitudinal axis of the tank.

Each hopper comprises four downwardly converging sides terminating at their bottom extremities in a discharge port. Each hopper is operable to gravitationally guide material in the tank toward its associated discharge port. The upper margins of the sides of each hopper abut with the sides of adjacent hoppers and the walls of the tank to form a substantially fluid seal between the upper and lower extremities of the tank.

There is at least one fluidizing pad provided adjacent the lower extremities of each hopper. There is also air inlet means communicating from a pressure source to the lower extremities of the tank and with each fluidizing pad to fluidize the material being gravitationally guided in the hoppers. The upper adjoining side margins of adjacent hoppers define relatively sharp ridges whereby no substantial horizontal flat surface is present.

Containers or tanks having the foregoing construction may be used in a fixed or stationary position. Suitably they may also be mounted on railroad cars for movement to a desired location as well as being mounted on truck trailers for similar purposes Tanks of this variety are used in conjunction with any type of pulverant material. One example of such a material which may be stored in the tank is cement in its pre-used dry form.

Hoppers are necessary in tanks of the type here under discussion because alternative means such as air pervious inclined devices like canvas belts running the full length inside of the tank do not efficiently clean or discharge all of the material in the tank. Thus, when the tank is approaching emptiness, a portion of the air permeable canvas belt becomes uncovered. Consequently, the fluidizing air goes through the uncovered portion and the cement or similar product is not fluidized. The portion of the material which does not become fluidized remains in the tank and does not flow through the discharge port.

Previously, tank such as the horizontal tank of the present invention have been made with external hoppers. These hoppers, usually three or four in number, had flat sides that were difficult to reinforce so that they could withstand the internal fluidizing air pressures. The elaborate reinforcements required added weight and expense to the construction of the external hoppers. Further, external hoppers generally require cutting the cylindrical shell at the hopper openings thereby weakening the main storage shell itself. In addition, tension ties had to be added on the inside of the tank or shell along with outside stiffeners in order to replace the effect of the structural support offered by the material when in the shell but which is no longer present as the material is removed from the shell. These relatively elaborate precautions were also necessary to handle the hoop stresses which were present.

The present construction avoids the necessity for the elaborate structural reinforcement required by the prior design and offers a less expensive and lighter weight tank. Specifically by employing internal hoppers instead of the conventional external hoppers, the pressure of the fluidizing gas may be balanced on both sides of the hopper inside of the tank. Consequently, the pressure of the gas itself is balanced and stresses in both directions are balanced eliminating the necessity of stiffening or structurally supporting the hopper so as to withstand the forces of the gas pressure. This is a particularly significant advantage on the higher pressures (25 p.s.i.) of pneumatic trailers.

In other words, by placing the hopper inside of the tank the air or other gas under pressure inside of the tank may be present on both sides of the hopper. As a result the pressure on both sides of the hoppers is equal and there is no force on the hopper aside from the weight of the material inside of the hopper. The only type of reinforcement then that is necessary is that which is sufficient to counteract the force from the material inside of the hopper.

Instead of balancing or allowing the gas under pressure to permeate and enter the areas on both sides of the hoppers in order to create the desired structural balance, there is an alternative construction which may be used. In this case, the space between the hopper sides and the walls of the tank may be filled with a light weight foam material such as, for example, a polyurethane foam. Any suitable nonporous material, i.e., the spaces in the foam are not connected, may be used for this purpose. When using this arrangement the air pressure on the inside of the hopper is balanced by the air trapped in the foam present between the exterior of the hopper and the walls of the tank. Again the hopper itself need only be made strong enough to support the pulverant material that is carried and dispensed by the hopper.

In the accompanying drawing there is shown in FIG. 1 a side elevational view of a tank construction provided by the present invention suitably mounted on a truck trailer.

FIG. 2 shows in side section the construction of FIG. 1 taken along the line 2—2.

FIG. 3 shows in side section an alternate embodiment of the tank construction.

More specifically with respect to the drawings, there is shown a truck 10 including a trailer shown generally at 11. The tank construction provided by the present invention is mounted on trailer 11 and is shown generally at 12. Tank construction 12 includes an enclosed normally horizontally disposed elongate cylindrical tank 13 having rounded or dished ends 14, 15. A cylindrical configuration with dished ends is preferably employed instead of other configurations which might be substituted since it is the most efficient configuration for a pressure vessel. The cylindrical shell absorbs the internal pressure in hoop stresses, whereas a flat sided vessel must be stiffened with heavy structural members. A horizontal tank is preferred over a vertical tank design because it is possible to obtain greater cubic volume with a lighter overall weight. More cubic content is possible with this configuration due to the legal road height limitations and legal width limitations of most States as well as the fact that the loading racks at cement plants and the like place a height limitation on the tank. For example, using the same truck body length it is possible to obtain a 770 cubic foot volume in a vertical tank design having an 11'6" overall height whereas it is possible to obtain an 820 cubic foot volume in a horizontal tank of the same height. Further, the horizontal tank trailer will weigh about 10,500 lbs. whereas the vertical tank design requires a weight of about 11,000 lbs.

Disposed and suitably fixed within tank 12 are a plurality of hoppers 16, 17, 18. Hoppers 16, 17, 18 are supported substantially wholly within the interior of tank 13 in spaced relation from each other along the longitudinal axis of tank 13. The hoppers are all of a similar construction and hopper 16 will be described more particularly and as exemplary of the others. Hopper 16 comprises four downwardly converging sides, two of which are shown most clearly in FIG. 2 at 19, 20. Sides 19, 20 are joined by sides 21, 22 as shown in FIG. 1. Sides 19, 20, 21 and 22 terminate at their bottom extremities in a discharge port 23.

Discharge port 23 is linked in fluid communication with a common conveyor pipe 24 by means of a pipe 25. Pipe 25 includes a valve 26 for opening and closing fluid communication between discharge port 23 and conveyor pipe 24. Conveyor pipe 24 slopes from the horizontal as at 27 in the direction of conveyance as illustrated by the arrow at the end pipe 24. This slope aids in discharging the pulverant materials.

Fluidizing pads 28, 29 are disposed adjacent the lower extremities of each hopper in sides 21, 22, respectively. Fluidizing pads 28, 29 are made from porous materials such as woven fabric and the like in a manner well known in the art.

As seen most clearly in FIG. 1, the upper adjoining side margins of adjacent hoppers 16, 17 and 17, 18 define a relatively sharp ridge as at 30, 31, respectively. It is important to form a sharp ridge between adjacent hoppers as at 30, 31 to prevent the buildup of pulverant materials on the surface that would be present but for the sharp ridges. Obviously, material remaining on surfaces between the upper margins of the hoppers could not be discharged through the ports of the hoppers.

The construction also includes an air feedback line 32 communicating from the upper extremities 33 of the pressure tank 13 to the common conveyor pipe 24 at a point located on the upstream side relative to all of the discharge ports such as port 23. A valve 34 is placed in feedback line 32 to adjustably control air flow therethrough to conveyor pipe 34.

Finally, the construction includes a source of compressed gas which in the drawings takes the form of a compressor 35 mounted on truck 10 and linked to tank 13 by tube 36.

In use, a dry pulverant material such as cement is placed in tank 13 through covered hatch 37. When it is desired to discharge the cement, a gas such as air is forced into tank 13 from compressor 35 through tube 36. The air under pressure occupies the space 38 between the hoppers 16, 17, 18 and tank 13. The only exit for the compressed air is through fluidizing pads such as pads 28, 29. The air passing through the fluidizing pads 28, 29 as in hopper 16 in the direction of the arrows fluidizes the cement in hopper 16. Opening valve 26 in pipe 25 permits the fluidized cement to pass through pipe 25 into common conveyor pipe 24 and on to the rear of the trailer in the direction of the arrow.

Air in the upper extremities 33 of the pressure vessel flows through feedback line 32 when valve 34 is opened. The air passing by valve 34 further serves to urge the fluidized cement out through common conveyor 24 while at the same time making room for more compressed air to move up through the fluidizing pads 28, 29. A similar sequence of events occurs simultaneously in the remaining hoppers 17, 18 until all of the cement has been fluidized and discharged out of the hoppers and through conveyor pipe 24. The process can be stopped and discharge ceased at any time by closing valve 26 in pipe 25 in combination with the closing of the corresponding valves of the remaining hoppers.

It should be noted that hoppers 16, 17, 18 are joined at their upper margins to form ridges 30, 31 and that terminal hoppers 16 and 18 are also joined to the ends 14, 15 of tank 13 also at their upper margins. As a result a substantial fluid seal is formed between the upper extremities 33 of tank 13 and the lower extremities or spaces 38 of tank 13. This insures that compressed air entering spaces 38 from duct 36 can pass only through the fluidizing pads and cannot take a short circuit bypassing the pads for exit through the feedback line 32.

As previously pointed out, hoppers 16, 17, 18 being internal do not require the bracing and structural modifications as when the hoppers are external. It should now be clear that this is so because the air pressure inside the hoppers is counter balanced by air under similar pressure in spaces 38. Alternatively and as noted above, spaces 38 may be filled with a light weight foam material which would serve to counter balance the forces against the sides of the hoppers by air under pressure therein. In either event the hoppers 16, 17, 18 need be constructed only so that they have sufficient rigidity to hold the weight of the pulverant material that is placed within them.

In the alternate embodiment shown in FIG. 3 there is provided a tank 39 with a plurality of hoppers 40 suitably disposed therein as in FIGS. 1 and 2. The embodiment differs, however, in that the fluidizing pad 41 is disposed in the bottom of the hopper 40 with the discharge port 42 being disposed generally in the center of the fluidizing pad 41. Compressed air is supplied through pipe 43 for passage upwardly through fluidizing pad 41 as illustrated by the arrows. Fluidized material which may be placed in hopper 40 flows downwardly through discharge port 42 into pipe 44 as illustrated. Compressed air entering from pipe 43 is suitably confined to the vicinity of pad 41 by baffles 45, 46. Space 47 between the hopper 40 and tank 39 may then be filled with a light weight foam material as discussed above to attain the desired support for hopper 40.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. Apparatus for storing and pneumatically discharging pulverant materials comprising: an enclosed normally horizontally elongate cylindrical tank defining a pressure chamber for containing pulverant materials to be stored and pneumatically conveyed therefrom; a plurality of hoppers supported substantially wholly within the interior of said tank in spaced relation from each other along the longitudinal axis thereof, each hopper comprising four downwardly converging substantially planar sides terminating at their bottom extremities in a discharge port, being operable to gravitationally guide pulverant material in the tank toward its associated discharge port; the angle of slope of the sides of the hoppers with respect to the horizontal exceeding the angle of repose of the pulverant material; the upper margins of the sides of each hopper abutting with the sides of adjacent hoppers and the walls of the tank to form a substantially fluid seal dividing the upper and lower portions of said tank and providing a common space in the lower portion of the tank below all of the hoppers; at least one fluid pervious fluidizing means located on the lower extremities of each hopper; and air inlet means communicating from a pressure source to said common space and each fluidizing means to fluidize the material being gravitationally guided on the hoppers; the upper adjoining side margins of adjacent hoppers defining a relatively sharp ridge whereby no substantial horizontal surface is present; said fluid pervious fluidizing means offering a minimum pressure drop to maintain minimum pressure differential between said common space and the upper portions of said tank.

2. Means for storing and pneumatically discharging pulverant materials in accordance with claim 1 and wherein each said discharge port is provided with an individual valve for regulating flow of materials from said pressure chamber into a common conveyor pipe mounted exteriorly of the bottom of the tank.

3. Means for storing and pneumatically discharging pulverant materials in accordance with claim 2 and including an air feedback line communicating from the upper extremities of the pressure vessel to the common conveyor pipe at a point located on the upstream side relative to all of the discharge ports, and valve means in said air feedback line to adjustably control air flow therethrough to said conveyor pipe.

4. Means in accordance with claim 1 wherein the fluidizing pad is disposed on one of said sides of each hopper only at the lower portion thereof.

5. Means in accordance with claim 1 wherein the fluidizing pad is disposed on the bottom of each hopper and the discharge port of each hopper is located through the pad.

References Cited by the Examiner
UNITED STATES PATENTS

| | | | |
|---|---|---|---|
| 1,313,361 | 8/19 | White | 302—52 |
| 2,030,553 | 2/36 | Tiley | 302—53 |
| 2,524,919 | 10/50 | Meincke | 302—53 |
| 2,527,455 | 10/50 | Schemm | 302—29 |
| 2,665,035 | 1/54 | Schemm | 302—29 |
| 2,915,341 | 12/59 | Friedman | 302—53 |
| 2,924,489 | 2/60 | Beckmann | 302—53 |

SAMUEL F. COLEMAN, *Primary Examiner.*

ANDRES H. NIELSEN, *Examiner.*